United States Patent [19]
Lee

[11] Patent Number: 6,026,457
[45] Date of Patent: Feb. 15, 2000

[54] PORTABLE COMPUTER HAVING A BURGLARPROOF DEVICE FOR AN AUXILIARY MEMORY

[75] Inventor: Jin-Hyup Lee, Kyungki-do, Rep. of Korea

[73] Assignee: SamSung Electronics Co., Ltd., Kyungki-do, Rep. of Korea

[21] Appl. No.: 08/904,772

[22] Filed: Aug. 1, 1997

[30] Foreign Application Priority Data

Aug. 1, 1996 [KR] Rep. of Korea ............. 96-32233

[51] Int. Cl.⁷ .................................................. G06F 13/00
[52] U.S. Cl. .................... 710/101; 710/102; 361/686; 361/737; 348/552
[58] Field of Search ................. 395/281–283; 361/686, 737, 748; 348/552; 364/708.1; 235/472

[56] References Cited

U.S. PATENT DOCUMENTS

| | | | |
|---|---|---|---|
| 4,806,745 | 2/1989 | Oogita | 235/492 |
| 5,450,271 | 9/1995 | Fukushima et al. | 361/686 |
| 5,595,074 | 1/1997 | Munro | 70/58 |
| 5,625,534 | 4/1997 | Okaya et al. | 361/686 |
| 5,691,928 | 11/1997 | Okaya et al. | 364/709.05 |

*Primary Examiner*—Ayaz R. Sheikh
*Assistant Examiner*—Raymond N Phan
*Attorney, Agent, or Firm*—Robert E. Bushnell, Esq.

[57] ABSTRACT

A portable computer having a burglarproof device for an auxiliary memory, is made up of a system main body having a receiving area at a predetermined position; an auxiliary memory assembly mounted in the receiving area of the system main body; and locking means disposed at a predetermined position of the system main body and the auxiliary memory assembly and of which locking state is released when a predetermined number is set.

6 Claims, 7 Drawing Sheets

PORTABLE COMPUTER HAVING A BURGLARPROOF DEVICE FOR AN AUXILIARY MEMORY

CLAIM OF PRIORITY

This application makes reference to, incorporates the same herein, and claims all benefits accruing under 35 U.S.C. §119 from an application for A Portable Computer Having a Burglarproof Device of an Auxiliary Memory earlier filed in the Korean Industrial Property Office on Aug. 1, 1996 and there duly assigned Ser. No. 32233/1996.

FIELD OF THE INVENTION

The present invention relates to a portable computer having a burglarproof device for an auxiliary memory. More particularly, the present invention relates to a portable computer having a burglarproof device for an auxiliary memory which enables an auxiliary memory to be separated from a main body of a system only when a password of the main body of the system set by a user is identical with password set in an auxiliary memory assembly.

DESCRIPTION OF THE RELATED ART

Auxiliary memory can readily be removed from portable computers. What is needed is a locking device for the auxiliary memory so that it will not become detached from the portable computer without authorization.

SUMMARY OF THE INVENTION

Accordingly, the object of the present invention is to provide a portable computer having a burglarproof device for an auxiliary memory which enables an auxiliary memory to be disassembled from a main body of a system only when a password of the main body of the system set by a user is identical with that set in an auxiliary memory assembly to substantially obviate one or more of the problems due to limitations and disadvantages of the related art.

To achieve the objects and in accordance with the purpose of the invention, as embodied and broadly described herein, a portable computer having a burglarproof device for an auxiliary memory, may be constructed with a system main body having a receiving area at a predetermined position; an auxiliary memory assembly mounted in the receiving area of the system main body; and locking means disposed at a predetermined position of the system main body and the auxiliary memory assembly and of which locking state is released when a predetermined number is set.

Additional objects and advantages of the invention are set forth in part in the description which follows, and in part will be obvious from the description, or may be learned by practice of the invention. The objects and advantages of the invention will be realized and attained by means of the elements and combinations particularly pointed out in the appended claims.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Figure 1A:
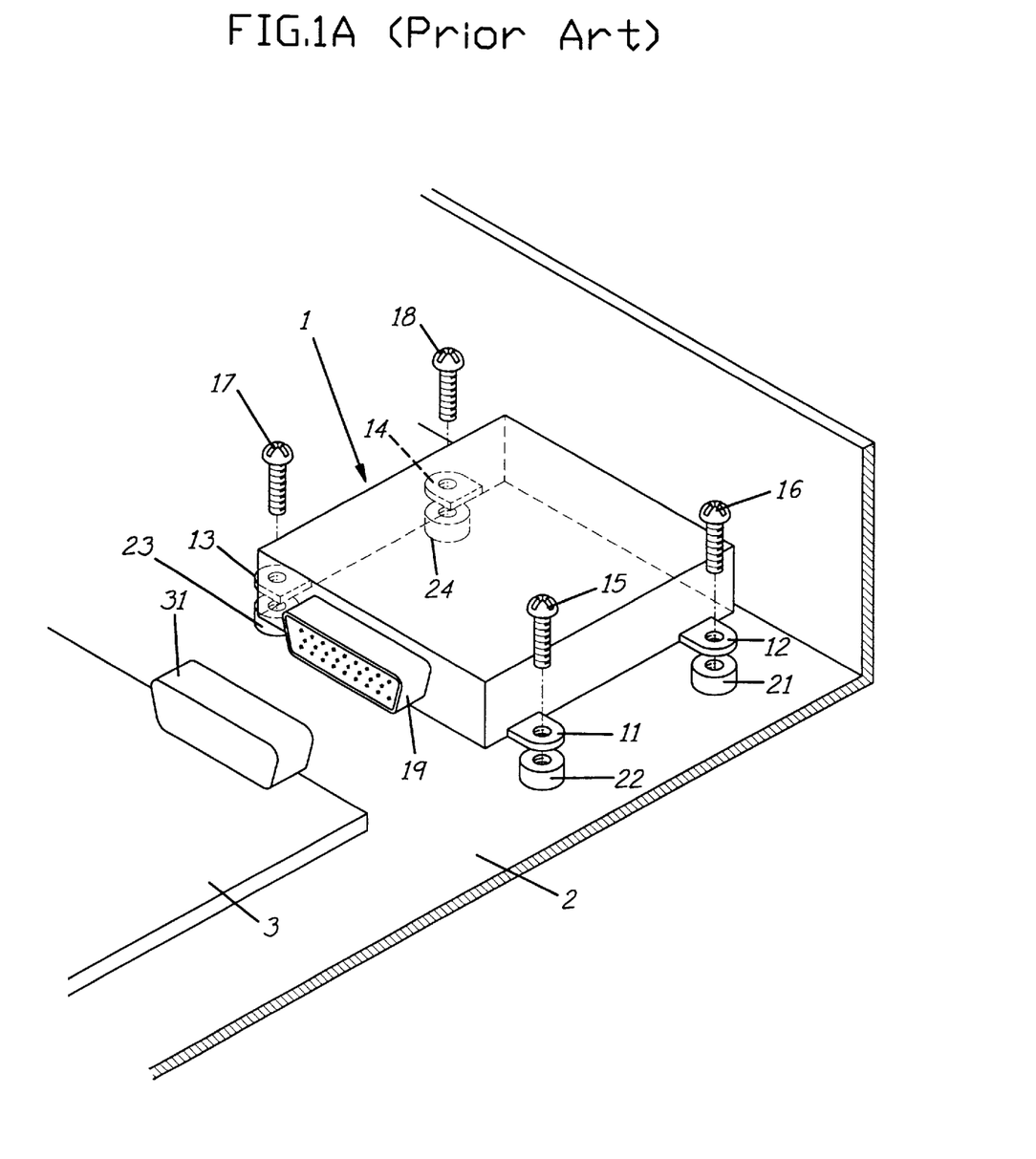
FIGS. 1A and 1B are perspective views showing a hard disk device and a main body of a conventional portable computer assembly.
Figure 1B:
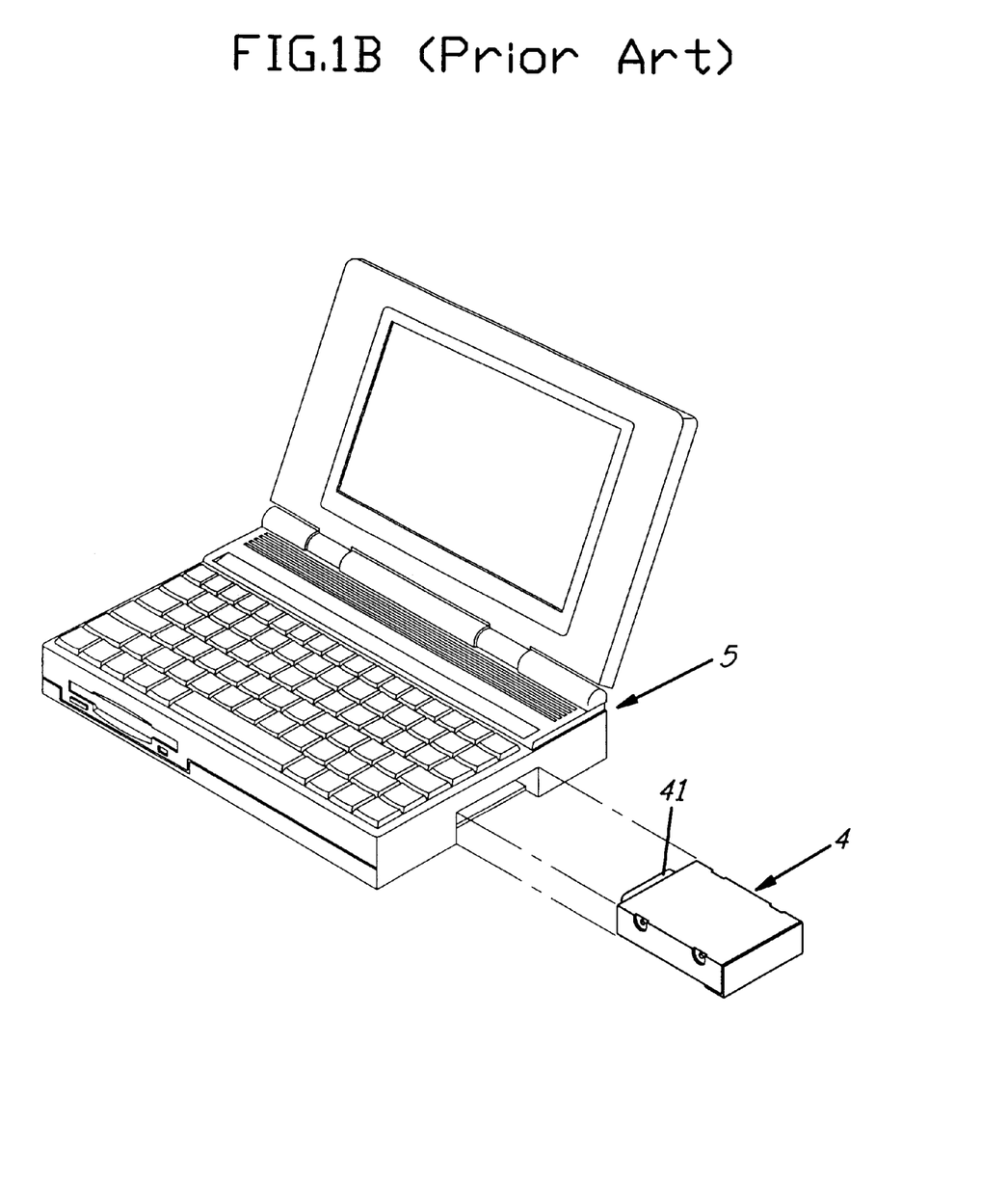

Hereinafter, an earlier portable computer is explained with reference to the accompanying drawings. FIGS. 1A and 1B are perspective views showing a hard disk device and a main body of a conventional portable computer assembly. Referring to FIG. 1A, the earlier portable computer is made up for an auxiliary memory 1 having a plurality of fixing plates 11 to 14, mounted on sides thereof, having a fixing hole, and a system case 2 having a plurality of PEM nuts 21 to 24 for fixing the auxiliary memory 1 by a plurality of screws 15 to 18.

The operation of the earlier portable computer is explained as follows. First, a connector 19 of the auxiliary memory 1 is inserted into a connector 31 of a main board 3 mounted in the system case 2. The main board 3 is a main circuit board on which main parts such as a processor, a main memory, a support circuit, a bus controller, a connector and so on are mounted. A plurality of fixing plates 11 to 14 of the auxiliary memory 1, having the fixing holes, are fixed to a plurality of PEM nits 21 to 24 by a plurality of screws 15 to 18, whereby the auxiliary memory 1, combined by the main board 3 and the connectors 19 and 31, is mounted in the system case 2.

However, the earlier portable computer has disadvantages in that a work process is complex since a user should disassemble the portable computer when replacing the auxiliary memory and anybody, except the user, can disassemble the auxiliary memory from the system case using tools which can unscrew the screws.

Referring to FIG. 1B, another earlier portable computer is made up of a detachable auxiliary memory 4, and a system main body 5 having a receiving space of a slot shape which enables the auxiliary memory 4 to be mounted therein from the outside.

The operation of another earlier portable computer is explained as follows. The user inserts the auxiliary memory 4 into the receiving space of the system main body 5 from the outside of the system main body 5. Here, a connector 41 of the auxiliary memory 4 is combined with a connector (not shown) of the system main body 5, and the auxiliary memory 4 is fixed to the system main body 5 by an additional locking device.

However, another earlier portable computer has also advantages in that the work process is complex since the user should disassemble the portable computer when replacing the auxiliary memory and anybody, except the user, can disassemble the auxiliary memory from the system case using the tools which can unscrew the screws.

Figure 2:
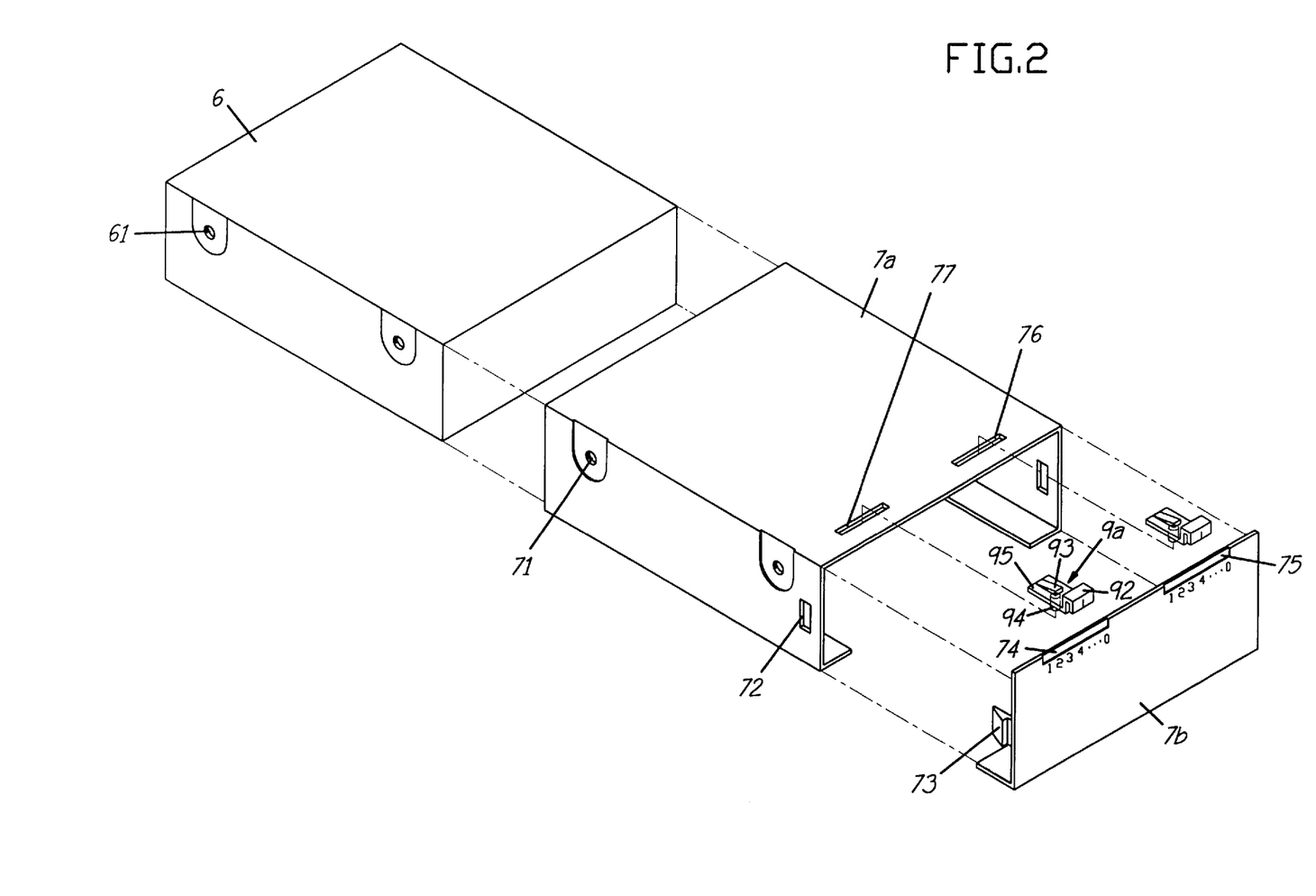
FIG. 2 is an exploded perspective view showing an auxiliary memory according to a preferred embodiment of the present invention.

First, referring to FIG. 2, an auxiliary memory according to the preferred embodiment of the present invention is explained. Here, a reference numeral, 6 indicates the auxiliary memory. The auxiliary memory assembly is made up of a bracket 7a having fixing holes 71 at sides thereof and screwed to the auxiliary memory 6, and a bezel 7b having a hook 73, having an elastical force, assembled into a fixing hole 72 positioned at the side of the bracket 7a.

Figure 3:
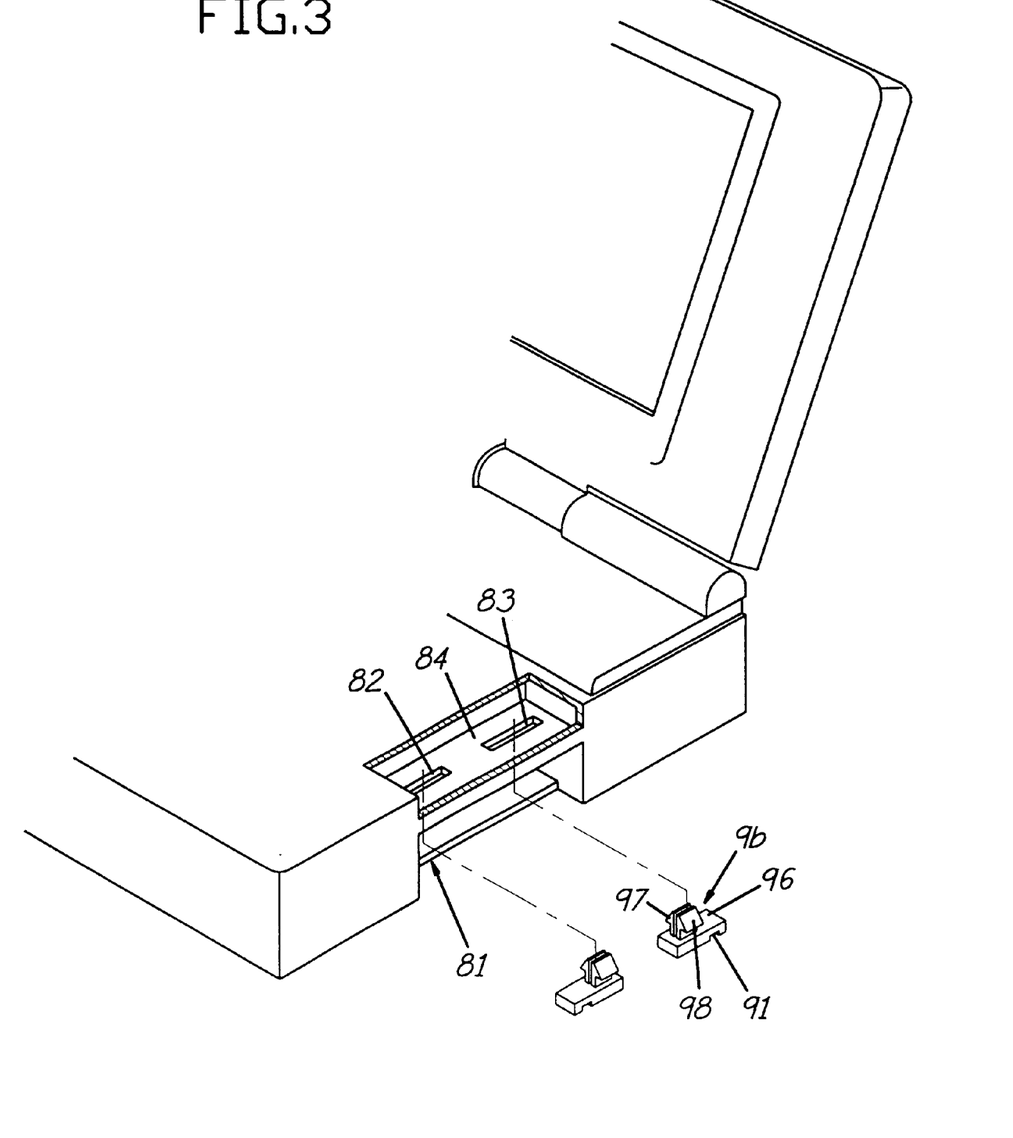
FIG. 3 is a perspective view of a system main body according to a preferred embodiment of the present invention.

Referring to FIG. 3, a system main body according to the preferred embodiment of the present invention is made up of a receiving area 81 having a shape of a slot and formed at a predetermined position in the side thereof to mount the auxiliary memory assembly, and a fixing plate 84 having a plurality of guide holes 82 and 83 within the receiving area 81.

Referring to FIGS. 2 and 3, a locking means according to the preferred embodiment of the present invention is made up of at least one knob 9a formed in the upper portion of the bezel 7b and for setting a password by moving to the left or to the right, and at least one latch 9b mounted in the guide holes 82 and 83 of the fixing plate 84 and for releasing the locking state only when the password set by the knob 9a is identical to that set by the position of a guide groove 91 formed in a bottom surface.

The knob 9a is made up of a hooking member 92 disposed at guide rails 74 and 75 formed in the upper portion of the bezel 7b, and a plate 95 connected to the side of the hooking member 92, having a projection 93 formed in an upper surface thereof and having a guide shaft 94 formed in a bottom surface thereof. The guide shaft 94 formed in the bottom surface of the plate 95 is inserted into slots 76 and 77 formed in the upper surface of the bracket 7a.

The latch 9b is made up of a plate 96 having a guide groove 91 formed on the bottom surface thereof for the movement of the projection 93 of the knob 9a, and a plurality of hooks 97 and 98 having an elastical force, formed at a predetermined position of the upper surface of the plate 96 and assembled into the guide holes 82 and 83. Numbers are indicated under the guide rails 74 and 75 and the guide holes 82 and 83 of the fixing plate 84, to set the password.

The assembling process of the portable computer having a burglarproof device for an auxiliary memory according to the preferred embodiment of the present invention is as follows. FIG. 2 is an exploded perspective view showing an auxiliary memory according to the preferred embodiment of the present invention. Referring to FIG. 2, the auxiliary memory 6 is mounted in the bracket 7a by a plurality of screws(not shown). Here, a screw(not shown) is screwed to the fixing holes 61 and 71 formed in the side of the auxiliary memory 6 and the side of the bracket 7a respectively. The bezel 7b is mounted to the bracket 7a by inserting the hook 73, having the elastical force, into the fixing holes 72 formed in the side of the bracket 7a. The hooking member 92 of the knob 9a is mounted on the guide rails 74 and 75 formed in the upper portion of the bezel 7b, and the guide shaft 94, formed in the bottom surface of the plate 95 of the knob 9a, is inserted into the slots 76 and 77 formed in the upper portion of the bracket 7a, thereby finishing the assembling of the auxiliary memory assembly.

Figure 4:
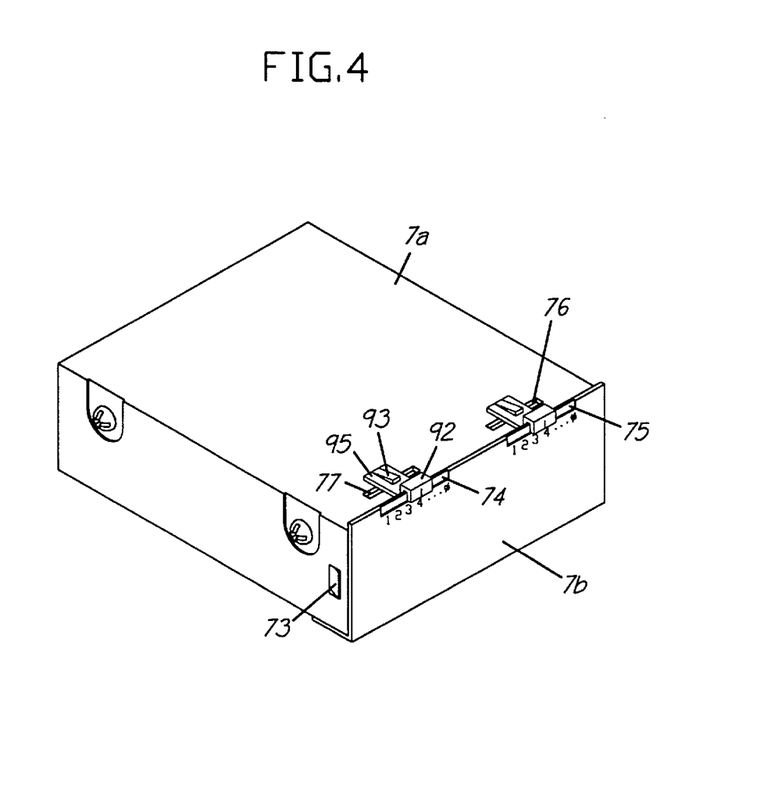
FIG. 4 is a perspective view for an auxiliary memory according to a preferred embodiment of the present invention.

FIG. 4 is a perspective view of the auxiliary memory according to the preferred embodiment of the present invention. Referring to FIG. 4, a user can set the password by moving the knob 9a to the left or to the right. Here, the hooking member 92 moves along the guide rails 74 and 75, and the guide shaft 94 moves though the slots 76 and 77.

FIG. 3 is a perspective view of the system main body according to the preferred embodiment of the present invention. Referring to FIG. 3, the assembling of the system main body is finished by inserting a plurality of hooks 97 and 98, formed on the plate 96 of the latch 9b, into the guide holes 82 and 83 of the fixing plate 84 formed within the receiving area 81.

Figure 5:
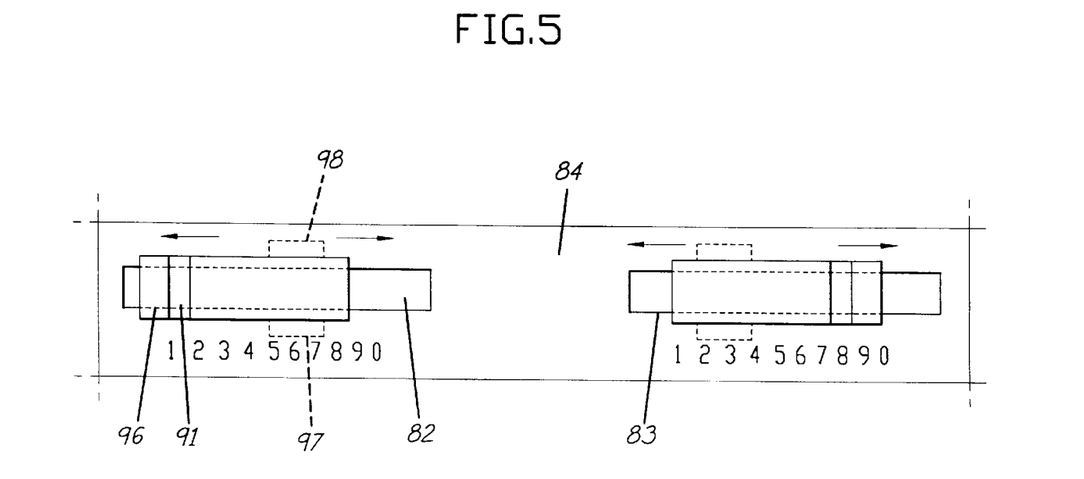
FIG. 5 is a view showing a latch mounted in a fixing plate of a system main body according to a preferred embodiment of the present invention.
Figure 6:
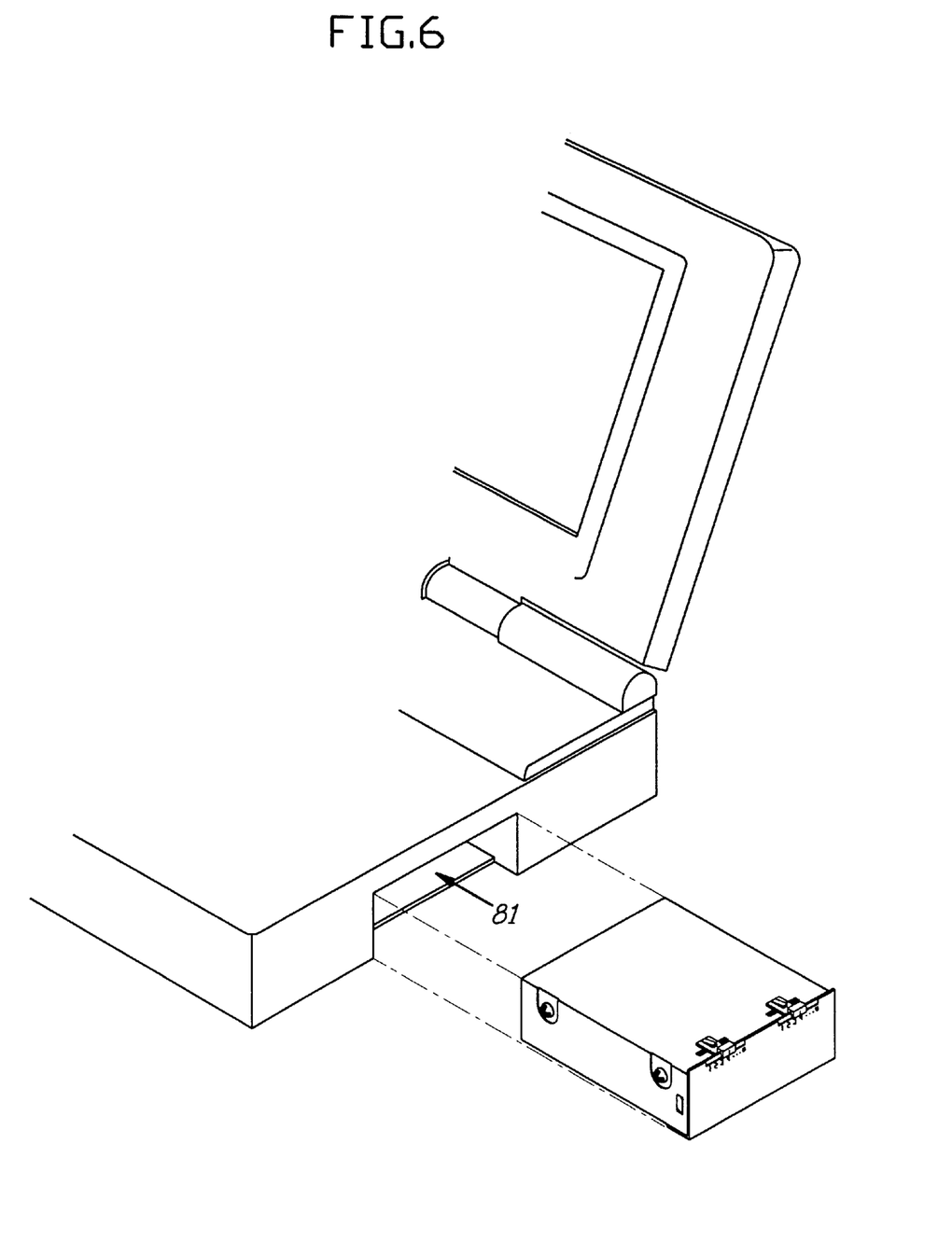
FIG. 6 is a perspective view showing an auxiliary memory and a system main body according to a preferred embodiment of the present invention.

FIG. 5 is a view showing the latch mounted in the fixing plate of the system main body according to the preferred embodiment of the present invention. Referring to FIG. 5, the user may set the password of the system main body since the user changes the position of the guide groove 91 by moving the latch 9b in the direction of an arrow.

Next, the process for assembling/disassembling the auxiliary memory assembly into/from the system main body is explained. First, the process for assembling the auxiliary memory assembly into the system main body is explained. The user presses a predetermined force on the auxiliary memory assembly in the direction of the arrow to mount the auxiliary memory assembly in the receiving area 81 of the system main body. Here, the auxiliary memory assembly can be mounted in the system main body even though the password of the system main body set by the guide groove 91 of the latch 9b is not identical to that of the auxiliary memory assembly set by the knob 9a since the upper surface of the projection 93 of the knob 9a is slanted.

Figure 7:
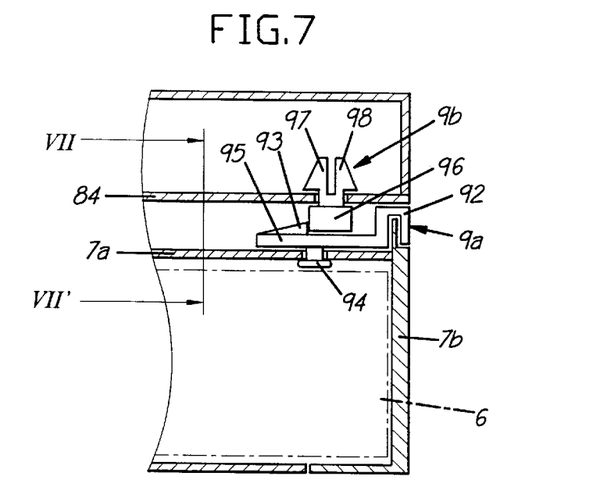
FIG. 7 is a partial expanded sectional view showing an auxiliary memory assembled to a system main body according to a preferred embodiment of the present invention.
Figure 8:
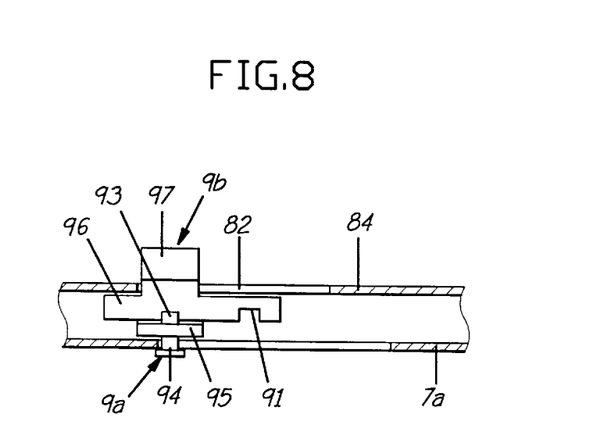
FIG. 8 is a sectional view taken along line VII-VII' shown in FIG. 7 and when passwords are not identical.

Second, the process of disassembling the auxiliary memory assembly from the system main body is explained. FIG. 8 is a sectional view taken along line VII-VII' shown in FIG. 7 and when passwords are not identical. Referring to FIG. 8, the projection 93 is hooked by the plate 96 of the latch 9b since the position of the projection 93 of the knob 9a of the auxiliary memory assembly is not identical to that of the guide groove 91 of the latch 9b mounted in the system main body when the password of the system main body set by the position of the guide groove 91 of the latch 9b is not identical to that of the auxiliary memory assembly set by the knob 9a. Accordingly, the auxiliary memory assembly can not be disassembled from the system main body.

Figure 9:
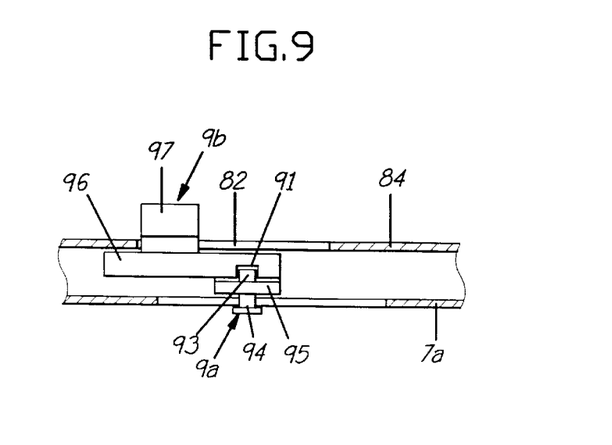
FIG. 9 is a sectional view taken along line VII-VII' shown in FIG. 7 and when passwords are identical.

However, the position of the projection 93 of the knob 9a becomes identical to that of the guide groove 91 of the latch 9b, as shown in FIG. 9, when the password set in the auxiliary memory assembly is identical to that of the system main body set by the latch 9b by operating the knob 9a. Here, the projection 93 of the knob 9a passes the plate 96 through the guide groove 91 of the latch 9b, thereby disassembling the auxiliary memory assembly from the system main body when the user applies the force to disassemble the auxiliary memory assembly from the system main body.

As described above, it is possible to prevent the burglary of the auxiliary memory without any additional locking device since it is possible to disassemble the auxiliary memory from the system main body only when the passwords of the system main body and the auxiliary memory assembly are identical.

Other embodiments of the invention will be apparent to the skilled in the art from consideration of the specification and practice of the invention disclosed herein. It is intended that the specification and examples be considered as exemplary only, with the true scope and spirit of the invention being indicated by the following claims.

What is claimed is:

1. A portable computer having a burglarproof device for an auxiliary memory, comprising:

a system main body having a receiving area at a predetermined position;

an auxiliary memory assembly mounted in the receiving area of the system main body; and locking means disposed at a predetermined position of the system main body and the auxiliary memory assembly and a locking state is released when a predetermined number is set, wherein the locking means includes:

at least one knob mounted at a predetermined position of the auxiliary memory assembly and for setting a password by moving to the left or to the right; and at least one latch mounted in a corresponding position to the knob within the receiving area of the system main body and for releasing the locking state only when the password set by the knob is identical to that of itself set previously, wherein the auxiliary memory assembly includes:

a bracket for protecting the sides and the upper surface of the auxiliary memory; and a bezel for protecting the front surface of the auxiliary memory, wherein the bracket includes:

a hole formed at a predetermined position in the side of the bracket to combine with the bezel; and a plurality of slots formed on the bracket to combine with the locking means, the bezel includes:

guide rails formed on the bezel; and a hook elastically combined with the hole formed in the side of the bracket, and the knob includes:

a hooking member disposed at the guide rails of the bezel; and a plate connected to the side of the hooking member, having a projection formed in an upper surface thereof, and having a guide shaft formed in a bottom surface thereof and combined with the slots of the bracket.

2. The portable computer having a burglarproof device for an auxiliary memory of claim 1, wherein the latch includes:

a plate having a guide groove formed on the bottom surface thereof for the movement of the projection of the knob to disassemble the auxiliary memory assembly from the system main body; and a plurality of hooks having an elastical force, formed at a predetermined position of the upper surface of the plate and assembled into the guide holes of the fixing plate.

3. A portable computer comprising:

a cover containing a display;

a base containing a keyboard and a receiving area; and a module insertable into said receiving area said module mechanically locking into said base of said portable computer by travelling between an unlocked position and a locked position, with the module remaining attached to said base when in the locked position, wherein said module is an auxiliary memory, with said auxiliary memory further comprising:

a bracket for protecting the sides and the upper surface of the auxiliary memory;

a bezel for protecting the front surface of the auxiliary memory, said bezel containing at least one guide rail; and a knob having a hook located at said guide rail of said bezel, said knob being manually incrementally adjustable to a plurality of positions by a user to set a password for the auxiliary memory as the knob travels among said plurality of positions.

4. The portable computer of claim 3, with said portable computer further comprising:

a receiving area formed at a predetermined position to mount the auxiliary memory assembly therein;

a plate mounted in the receiving area, said plate being perforated by at least one guide hole; and a latch inserted into said guide hole, said latch being manually incrementally adjustable to a plurality of positions by a user to set the password of the base of the portable computer as the latch travels among said plurality of positions across the guide hole.

5. The portable computer of claim 4, wherein said auxiliary memory may be removed from said base receiving area of said portable computer only if said password of said auxiliary memory matches said password of said base of said portable computer.

6. The portable computer of claim 5, wherein said auxiliary memory contains a plurality of knobs and said base of said computer contain a plurality of latches.

* * * * *